United States Patent
Visoz et al.

(10) Patent No.: US 7,298,778 B2
(45) Date of Patent: Nov. 20, 2007

(54) SUB-OPTIMAL ITERATIVE RECEIVER METHOD AND SYSTEM FOR A HIGH-BIT-RATE CDMA TRANSMISSION SYSTEM

(75) Inventors: Raphael Visoz, Issy les Moulineaux (FR); Hatem Boujemaa, Bourg la Reine (FR)

(73) Assignee: France Telecom, Paris (FR)

( * ) Notice: Subject to any disclaimer, the term of this patent is extended or adjusted under 35 U.S.C. 154(b) by 481 days.

(21) Appl. No.: 10/488,827

(22) PCT Filed: Aug. 9, 2002

(86) PCT No.: PCT/FR02/02848

§ 371 (c)(1),
(2), (4) Date: Sep. 3, 2004

(87) PCT Pub. No.: WO03/021805

PCT Pub. Date: Mar. 13, 2003

(65) Prior Publication Data

US 2005/0013348 A1 Jan. 20, 2005

(30) Foreign Application Priority Data

Sep. 6, 2001 (FR) .................................. 01 11549

(51) Int. Cl.
*H04B 1/00* (2006.01)
(52) U.S. Cl. ....................................... 375/148; 375/348
(58) Field of Classification Search ................ 375/130, 375/135, 140, 144, 147, 148, 233, 265, 316, 375/340, 341, 348, 347, 260; 714/755, 786, 714/792, 795

See application file for complete search history.

(56) References Cited

U.S. PATENT DOCUMENTS

| | | | |
|---|---|---|---|
| 5,809,086 A | | 9/1998 | Ariyavisitakul |
| 5,875,215 A | * | 2/1999 | Dobrica ...................... 375/332 |
| 6,097,763 A | * | 8/2000 | Djokovic et al. ........... 375/260 |
| 6,349,112 B1 | * | 2/2002 | Shibata ........................ 375/232 |
| 6,373,888 B1 | * | 4/2002 | Lindoff ....................... 375/231 |
| 6,377,636 B1 | * | 4/2002 | Paulraj et al. .............. 375/346 |
| 6,381,271 B1 | * | 4/2002 | Javerbring .................. 375/233 |
| 6,426,973 B1 | * | 7/2002 | Madhow et al. ........... 375/231 |
| 6,556,634 B1 | * | 4/2003 | Dent ........................... 375/343 |

(Continued)

OTHER PUBLICATIONS

Alexandra Duel-Hallen et al., "Delayed Decision-Feedback Sequence Estimation", May 1989, IEEE Transactions on Communications, vol. 37, pp. 428-436.*

(Continued)

*Primary Examiner*—David C. Payne
*Assistant Examiner*—Rahel Guarino
(74) *Attorney, Agent, or Firm*—Patterson, Thuente, Skaar & Christensen, P.A.

(57) ABSTRACT

A reception method and receiver structure that are relatively simple, that have close to optimum performance, and that use high order modulation combined with a low spreading factor are disclosed. The method receives a signal transmittal in the form of sequences of coded binary symbols comprising both predefined pilot symbols and date symbols multiplied by a spreading sequence. The method also includes a step of determining a channel estimate using received predefined pilot symbols. A system for receiving a signal transmitted on a multipath transmission channel using a spread spectrum technique and low spreading factor is also disclosed.

10 Claims, 3 Drawing Sheets

U.S. PATENT DOCUMENTS

| | | | | |
|---|---|---|---|---|
| 6,643,646 | B2* | 11/2003 | Su et al. | 707/6 |
| 6,647,003 | B1* | 11/2003 | Abeta et al. | 370/335 |
| 6,658,071 | B1* | 12/2003 | Cheng | 375/348 |
| 6,690,739 | B1* | 2/2004 | Mui | 375/265 |
| 6,721,293 | B1* | 4/2004 | Komulainen et al. | 370/335 |
| 6,724,844 | B1* | 4/2004 | Ghosh | 375/350 |
| 6,956,916 | B1* | 10/2005 | Matsui | 375/347 |
| 6,993,070 | B1* | 1/2006 | Berthet et al. | 375/232 |
| 2002/0041644 | A1* | 4/2002 | Brunel | 375/346 |
| 2002/0141486 | A1* | 10/2002 | Bottomley et al. | 375/148 |

OTHER PUBLICATIONS

Takayuki Nagayasu et al., "A Receiver With Iterative Soft Decision and Forward Error Correction", Electronics and Communications in Japan, Scripta Technica, New York, U.S., vol. 83, No. 9, Part 1, Sep. 2000, pp. 76-85.

Volker Franz et al., "Iterative Channel Estimation for Turbo-Detection", ITG Fachberichte, VDE Verlag, Berlin, DE, No. 146, Mar. 1998, pp. 149-154.

Sirikiat Ariyavisitakul et al, "Joint Equalization and Interference Suppression for High Data Rate Wireless Systems", Vehicular Technology Conference, 1999 IEEE 49th Houston, TX, USA, May 16-20, 1999, Piscataway, NJ, USA, IEEE, US, May 16, 1999, pp. 700-706.

Hatem Boujemaa et al., "On the Rake Receiver Performance", VTC 2000 Fall, Boston, USA, 6 pages.

Irfan Ghauri et al, "Linear Receivers for the DS-CDMA Downlink Exploiting Orthogonality of Spreading Sequences", Proc. 32nd Asilomar Conf. on Signals, Systems and Comp., Asilomar, CA, Nov. 1-4, 1998, pp. 650-654.

Markku J. Heikkilä et al, "Interference Suppressionin CDMA Downlink through Adaptive Channel Equalization", VTC 1999 Fall, Tokyo, Japan, pp. 978-982.

S. Tantikovit et al., "Joint Multipath Diversity Combining and MLSE Equalization (Rake-MLSE Receiver) for WCDMA Systems", VTC 2000 Spring, Tokyo, Japan, 5 pages.

Alexandra Duel-Hallen et al., "Delayed Decision-Feedback Sequence Estimation", IEEE Transactions on Communications, vol. 37, pp. 428-436, May 1989.

Catherine Douillard et al., "Iterative Correction of Intersymbol Interference: Turbo-Equalization", European Transactions on Telecommunications, vol. 6, pp. 507-511, Sep. 1995.

Claude Berrou et al., "A Low Complexity Soft-Output Viterbi Decoder Architecture", ICC 1993, pp. 733-740, Geneva, Switzerland, May 1993.

L.R. Bahl et al., "Optimal Decoding of Linear Codes for Minimizing Symbol Error Rate", IEEE Transactions on Information Theory, vol. IT-20, pp. 284-287, Mar. 1994.

Gerhard Bauch et al., "Iterative Equalization and Decoding in Mobile Communications Systems", Proc. EPMCC 1997, pp. 307-312, Bonn, Germany, Sep. 1997.

Alain Glavieux et al., "Turbo Equalization Over A Frequency Selective Channel", Brest, France, Sep. 1997, 7 pages.

Aline Roumy et al., "Joint Equalization and Decoding: Why Choose the Iterative Solution?", IEEE VTC 1999 Fall, Amsterdam, Netherlands, Sep. 1999, 5 pages.

* cited by examiner

SUB-OPTIMAL ITERATIVE RECEIVER METHOD AND SYSTEM FOR A HIGH-BIT-RATE CDMA TRANSMISSION SYSTEM

This application claims priority to PCT Application No. PCT/FR02/02848 filed Aug. 9, 2002 and French Application No. 0111549 filed Sep. 6, 2001.

The present invention relates to a high-bit-rate radio receiver method and system for receiving signals in a radio system utilizing the code division multiple access (CDMA) technique.

BACKGROUND OF THE INVENTION

Information is transmitted in mobile telephone systems using a multiple access technique. Some systems use frequency division multiple access (FDMA) and time division multiple access (TDMA), users of the network being distinguished from each other by the respective frequency used and by the information to be transmitted being delivered in time slots assigned to each user. In systems based on code division multiple access (CDMA), users communicate with each other using the same radio frequency band. To be able to distinguish users from one another, each is assigned a respective spreading code for the whole duration of a connection, the code being used to spread the spectrum of the signal to be transmitted in base band. To reconstitute the information transmitted, the receivers must use the same code to effect the operation that is the converse of the spreading operation. Compared to other multiple access methods, this technique has the advantage of being more flexible in terms of access and bit rate, which can be varied by altering the spreading factor.

In radio transmission, the form of the medium between the sender and the receiver of a radio signal interferes with transmission and leads to propagation along multiple paths caused by reflections at different points along the radio channel, especially in an urban environment. As a result, components of the same signal reach the receiver with different powers and different time delays.

CDMA receiver systems use a rake receiver to reconstitute the transmitted signal from the components received over different propagation paths. These receivers are based on reconstituting a delay profile or radio channel equivalent model. To this end, a sequence of pilot symbols known to the receivers is transmitted together with the information, and on the basis of this prior knowledge the receivers perform an estimation (an impulse response representing all the paths of the radio channel) of the radio channel over which the received signal was transmitted. A matched filter is shifted over the received signal, for example by half a spreading code unit, while the received power is measured. This technique is used to construct an impulse response graph giving information on the power and the time delays caused by multipath propagation of the components of the signal received over a given radio channel.

Although the CDMA technique would seem to be very suitable for real time low-bit-rate services, it appears to be unsuitable for high-bit-rate packet services because the performance of the rake receiver is based on cross-correlation and autocorrelation properties of the spreading sequences, which improves as the length of the spreading sequence, and thus of the spreading factor, is increased. Now, the higher the bit rate, the lower the spreading factor. The spreading sequence becomes shorter and the cross-correlation and autocorrelation properties of the spreading sequences are therefore degraded, leading to interference between symbols of the same transmitted signal. As a result of this, the performance of the rake receiver is seriously degraded for spreading factors less than 8, especially if the type of modulation used has a large number of states.

A study of the degraded performance of rake receivers caused by intersymbol interference has shown that it is necessary to use an equalization technique if the spreading factor is less than 16 (see [1] "On the rake receiver performance" H. Boujemaa, M. Siala, VTC 2000 Fall, Boston, USA).

Thus rake receivers on their own are found to be a very unsuitable response to the requirements of high-bit-rate mobile telephony.

At present it is virtually impossible to use optimum detection and encoding techniques, as this leads to very high calculation complexity, especially if the transmission channels have an impulse response that is too long, as is the case in an urban environment.

Various suboptimal detection and decoding methods are used in the time division multiple access (TDMA) technique.

For example, the technique using a linear minimum mean square error equalizer (LMMSE) reduces not only intersymbol interference but also interuser interference. For more, details, see the documents:

[2] "Linear receivers for the DS-CDMA downlink exploiting orthogonality of spreading sequences" by I. Ghauri and D. T. M. Slock, in Proc. 32nd Asilomar Conf. on Signals, Systems and Comp., Asilomar, Calif., Nov. 1-4 1998, and

[3] "Interference Suppression in CDMA Downlink through Adaptive Channel Equalization", by M. Heikkilä, P. Komulainen, and J. Lilleberg, in VTC 99 Fall, Tokyo, Japan.

Note that interuser interference on downlinks is caused by multipath propagation in the channels, given that the spreading sequences of different users are mutually orthogonal. That solution proves to be very effective at reducing interuser interference, compared to rake receivers. However, because of the linear characteristics of the LMMSE equalizer, that solution does not significantly reduce intersymbol interference.

It has also been proposed to provide a maximum likelihood sequence estimation equalizer (MLSE) at the output of a rake receiver. For more details of that technique see for example the document [4] "Joint multipath combining and MLSE equalization (rake-MLSE Receiver) for WCDMA systems" by S. Tantikovit, and A. U. H. Sheikh, in VTC 2000 Spring, Tokyo, Japan.

That solution is optimized from the sequence-detection point of view, and close to the optimum solution in terms of detecting errors in the symbols transmitted. However, the complexity of that solution increases exponentially with the spreading of the time delays in the same channel and with the size of the modulation constellation employed. Thus it cannot be applied to all UMTS services. Furthermore, that solution does not take into account the degraded performance caused by incorrect channel estimation and channel coding. Furthermore, it does not offer a flexible or weighted output algorithm.

The prior art delayed decision feedback sequence estimation (DDFSE) technique reduces the complexity of the states of the trellis by using the "per survivor" processing technique. For more details of that technique, see for example the document [5] "Delayed Decision-Feedback Sequence Estimation" by A. Duel-Hallen and C. Heegard, in IEEE Transactions on Communications, Vol. 37, pp. 428-436, May 1989.

In TDMA systems, that technique has the drawback of being sensitive to error propagation, which necessitates prefiltering. That technique appears to be inapplicable to CDMA systems since the channel equivalent model at the rake receiver output varies on each symbol transmitted, as it depends on the spreading code, which changes on each symbol.

An iterative detection and decoding method designed for the TDMA technique and known as "turbo-detection" is described in the paper [6] "Iterative Correction of Intersequential Interference: Turbo-equalization" by C. Douillard, M. Jezequel, C. Berrou, A. Picart, P. Didier and A. Glavieux, published in European Transactions on Telecommunications, Vol. 6, p. 507 to 511, September 1995. In that detection and decoding technique, an MLSE equalizer with weighted inputs and outputs (SISO MLSE) is used, and the decoding process is of the Viterbi type, also with weighted inputs and outputs (SOVA). That process is described in a paper [7] entitled "A low Complexity Soft Output Viterbi Decoder Architecture", ICC '93 p. 733 to 740, Geneva, Switzerland, May 1993.

The above detection and decoding technique has been further developed, yielding optimized maximum a posteriori probability (MAP) detectors. For more details of those detectors, see the following papers:

[8] "Optimal Decoding of Linear Codes for Minimizing Symbol Error Rate" published by L. R. Bahl, J. Cocke, F. Jelinek and J. Raviv in IEEE Transactions on Information Theory, Vol. IT-20, p. 284-287, March 1994; and

[9] "Iterative Equalization and Decoding in Mobile Communications Systems", published by G. Baush, H. Khorram and J. Hagenauer in Proc. EPMCC '97, p. 307-312, Bonn, Germany, September 1997.

However, the above solution has not been transposed to CDMA systems, and further introduces undue complexity of the receiver, of the order of $M^L$, where M is the number of points of the modulation constellation and L is the number of echoes in the propagation channel taken into account. Moreover, it does not address the channel estimation problem.

Finally, the paper [10] "Turbo-Equalization over Frequency Selective Channel"

International Symposium on Turbo-Codes, Brest, France, September 1997, proposes an iterative symbol detection and channel decoding technique, known as "turbo-equalization" and significantly different from the turbo-detection technique mentioned above, and which presupposes a noisy estimation of the transmission channel. However, compared to the turbo-detection technique, the turbo-equalization technique degrades performance in a way that is strongly dependant on the equalization technique employed for the first iteration. On that subject, see the paper [11] "Joint Equalization and Decoding: Why Choose the Iterative Solution?" by A. Roumy, I. Figalkow and D. Pirez, in IEEE VTC '1999 Fall, Amsterdam, Netherlands, September 1999.

That technique cannot be transposed to CDMA systems since it is based on filtering techniques that cannot be applied if the channel varies independently from one transmitted symbol to another.

SUMMARY OF THE INVENTION

An object of the present invention is to solve these problems in order to propose a reception method and a receiver structure that are relatively simple, that have close to optimum performance, and that use high order modulation combined with a low spreading factor. This object is achieved by providing a method of receiving a signal transmitted on a multipath transmission channel using a spread spectrum technique with a low spreading factor, said signal being transmitted in the form of sequences of coded binary symbols comprising both predefined pilot symbols and data symbols multiplied by a spreading sequence, said method including a step of determining a channel estimate using received predefined pilot symbols.

It applies in particular, although not exclusively, to high-bit-rate (at least 2 megabits per second (Mbit/s)) mobile telephone systems such as the European Universal Mobile Telecommunication System (UMTS) designed to offer a wide range of services having different bit rates and spreading factors. The services include a high speed downlink packet access (HSDPA) mode of transmission to mobile terminals that is characterized by dispensing with closed loop power control and link adaptation utilizing variable constellation modulation (QPSK, MAQ16, MAQ64) and a low spreading factor.

According to the invention, the method comprises the steps of:

reconstituting the transmitted signal using the channel estimate on the basis of received signals that were transmitted over the multiple paths of the transmission channel, determining from the channel estimate an equivalent model of the channel as seen from the reconstituted signal, reducing intersymbol interference in the reconstituted transmitted signal resulting from a low spreading factor, using the channel equivalent model and a DDFSE detector based on a trellis with a reduced number of states and delivering at its output estimated values of the received coded symbols, de-interleaving the coded symbols, and decoding the estimated values of the de-interleaved coded symbols to reconstitute the transmitted data symbols.

The estimated values of the coded symbols received obtained after interference reduction and after decoding are advantageously weighted or flexible values.

According to a feature of the invention, the steps of reducing intersymbol interference and of decoding are included in an iterative process wherein the de-interleaved coded symbols obtained in an iteration n are re-estimated during decoding as a function of the data symbols obtained after decoding and error correction, the difference between the re-estimated coded symbols obtained in the same iteration and the de-interleaved coded symbols obtained in the next iteration n+1 is re-interleaved and then applied to the input of the DDFSE detector and subtracted from the coded symbols obtained in the iteration n+1 at the output of the DDFSE detector.

The channel estimate is advantageously improved using the least squares (LS) method.

The channel estimate is preferably improved using the minimum mean square error (MMSE) algorithm.

According to another feature of the invention, the channel is estimated in an iterative process wherein the coded and de-interleaved symbols obtained in an iteration n are re-estimated during decoding, as a function of the data symbols obtained after decoding and error correction, the re-estimated coded symbols being interleaved, a channel estimate being obtained on the basis of the re-estimated and interleaved coded symbols, an equivalent channel model being determined from the channel estimate, and the channel estimate and the channel equivalent model determined in an iteration $\underline{n}$ being respectively used to reconstitute the transmitted signal and to reduce intersymbol interference in the next iteration n+1.

The invention also provides a system for receiving a signal transmitted on a multipath transmission channel using a spread spectrum technique and a low spreading factor, said signal being transmitted in the form of a sequence of coded binary symbols comprising predefined pilot symbols and data symbols and multiplied by a spreading sequence, said system comprising a rake receiver for reconstituting the transmitted signal using a channel estimate on the basis of the signals received and transmitted by the multiple paths of the transmission channel and channel estimation means for estimating the channel on the basis of the pilot symbols received, to deliver a transmission channel estimate to the rake receiver.

According to the invention, the system further comprises:
  channel modeling means for determining an equivalent model of the channel as seen at the output of the rake receiver as a function of the channel estimate,
  reduction means for reducing intersymbol interference between received symbols, comprising a DDFSE detector based on a trellis with a reduced number of states, for reducing intersymbol interference between received symbols using the equivalent channel model and reconstituting estimated values of the coded symbols received,
  de-interleaving means for de-interleaving the estimated values of the received coded symbols, and
  decoding means for decoding the estimated and de-interleaved values and supplying the transmitted data symbols.

The estimated and decoded values delivered by the intersymbol interference reduction means and the decoding means are advantageously weighted or flexible values.

According to a feature of the invention, the system further comprises:
  means for re-estimating the coded symbols as a function of the decoded data symbols after error correction,
  first subtraction means for subtracting the estimated and de-interleaved coded symbols from the re-estimated coded symbols and obtaining a sequence of extrinsic re-estimated coded symbols,
  first interleaving means for interleaving the sequence of extrinsic re-estimated coded symbols, and
  second subtraction means for subtracting the sequence of extrinsic re-estimated coded symbols from the sequence of symbols received and estimated by the reduction means on the next iteration.

According to another feature of the invention, the system further comprises:
  second interleaving means for interleaving the sequence of re-estimated coded symbols at the output of the decoding means, and
  second channel estimation means for supplying a transmission channel estimate on the basis of the interleaved sequence of re-estimated coded symbols to the means for determining an equivalent channel model and to the rake receiver.

BRIEF DESCRIPTION OF THE DRAWINGS

A preferred embodiment of the invention is described hereinafter by way of non-limiting example and with reference to the accompanying drawings, in which.

DETAILED DESCRIPTION

Figure 1:
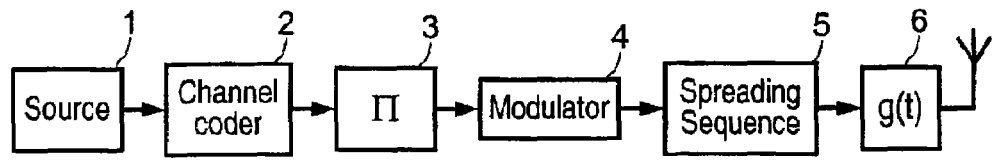
FIG. 1 is a diagram showing a conventional transmitter designed to transmit signals using the CDMA technique.

FIG. 1 shows a prior art CDMA transmitter, comprising a signal source 1 supplying sequences of $\tau_0$ binary symbols $u_1^{\tau_0} = \{u_1, \ldots, u_{\tau_0}\}^T$ and a channel encoder 2 that supplies a coded sequence $c_1^{\tau_0} = \{c_1, \ldots, c_{\tau_0}\}^T$.

Each data symbol $u_n = \{u_{n,1}, \ldots, u_{n,k_0}\}^T$ contains $k_0$ bits and each symbol $c_n = \{c_{n,1}, \ldots, c_{n,n_0}\}^T$ contains $n_0$ bits. The coded bits are interleaved by an interleaver 3 and padded out to correspond to a predetermined transmission format, i.e. frames of length $\tau$ containing pilot symbols to allow a receiver to carry out channel estimation. The resulting bits are grouped into symbols of type $a_k = (a_{k,l}, \ldots, a_{k,q})$ containing q bits before they are fed to a modulator 4 performing M-th order phase-shift keying (M-PSK), MAQ16 or MAQ64, which supplies a corresponding modulated symbol s(k).

The signal s(k) is then multiplied at 5 by a predefined spreading sequence c(q) for the transmission in question, the resulting signal being passed through a raised cosine square root filter 6 (Nyquist root filter), with a spectral occupancy factor (roll-off) of 0.22.

Figure 2:
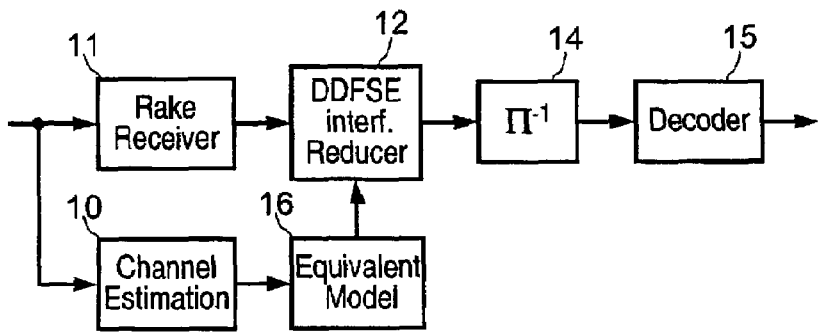
FIG. 2 is a diagram showing a reception system of the invention.

In FIG. 2, the receiver of the invention comprises a rake receiver 11 that utilizes a channel estimate supplied by a channel estimator 10 and is followed by an intersymbol interference reduction device 12 to which an equivalent model 16 of the transmission channel is fed. The output of the interference reduction device 12 is connected to a decoder 15 via a de-interleaver 14 carrying out the operation that is the converse of the interleaving operation 3. Moreover, the channel estimate supplied by the estimator 10 is applied to the channel model 16 to determine a channel equivalent model.

According to the invention, the intersymbol interference reduction device 12 is of the delayed decision feedback sequence estimation (DDFSE) type with weighted input and output, i.e. takes the form of a logarithm $\ln[p(1)/p(0)]$ of the ratio of probabilities p(1) and p(0) that the signal level is respectively logic level 1 and logic level 0. Similarly, the decoder 15 also has weighted inputs and outputs.

In the case of multipath propagation, the signal received at the input of the spread spectrum receiver at time $t$ takes the form:

$$r(t) = \sum_{l=1}^{L} h_l(t) \sum_k s(k) e_k(t - kT_s - \tau_l(t)) + w(t) \qquad (1)$$

in which $$e_k(t) = \sum_{q=0}^{N-1} e(kN+q)g(t-qT_c)$$ (3)

is the waveform for the modulated symbol s(k), e(q) is the spreading sequence, N is the spreading factor, g(t) is the transfer function of the Nyquist root filter 6, $T_e$ and $T_s$, are respectively the "chip" and symbol periods, L is the number of paths in the channel, $h_l(t)$ and $\tau_l(t)$ are respectively the complex amplitude and the time delay of the l-th path, and $\omega(t)$ is Gaussian white noise with a power spectral density $N_0$.

If d(i) is the product of the transmitted symbols and multiplied by the spreading sequence, $$c(i)s\left(\left\lfloor \frac{i}{n} \right\rfloor\right),$$

where $\lfloor \; \rfloor$ represents the "integer part" function, the received signal can also be written in the following form:

$$r(t) = \sum_i d(i) h^i(t - iT_c)$$ (1)

in which:

$$h^i(t) = \sum_{l=1}^{L} h_l(t + iT_c) g(t - \tau_l(t + iT_c))$$ (2)

In accordance with Nyquist's theorem, the received signal r(t) is sampled at twice the chip frequency to obtain a vector r(i) of stacked samples, which is used to estimate the chip symbol i.

The vector r(i) takes the following form:

$$r(i) = \begin{pmatrix} r((i-M_1)T_c) \\ r((i-M_1)T_c + T_c/2) \\ \vdots \\ r((i+M_2)T_c) \end{pmatrix} = H(i)d(i) + w(i)$$ (4)

in which $M_1$ and $M_2$ represent the length of $h^i(t)$ as a multiple of $T_e$, $$H(i) = [h^{M_1+M_2}(i), \ldots, h^0(i), h_1(i), \ldots, h_{M_1+M_2}(i)]$$ (5)

$$h^j(i) = [h^i((j-M_1)T_c), h^i((j-M_1)T_c+T_c/2), \ldots, h^i(M_2T_c), 0_{1,2j}]^T, \; 0 \leq j \leq M_1+M_2,$$ (6)

$$h_j(i) = [0_{1,2j}, h^i(-M_1T_c), h^i(-M_1T_c+T_c/2), \ldots, h^i((M_2-j)T_c)]^T, \; 0 \leq j \leq M_1+M_2,$$ (7)

and $$d(i) = [d(i-M_1-M_2), \ldots, d(i), \ldots, d(i+M_1+M_2)]^T$$ (8)

After the operation that is the converse of the spreading operation, the reduced signal for the symbol k on the branch i (path i of the transmission channel) can be written as follows:

$$z_k(\tau_j) = s_k h_j + \sum_{i \neq j} h_i \sum_{n=kN}^{(k+1)N-1} e_n^* d_{n+\tau_{ji}} + w_k(\tau_j)$$ (9)

in which $d_k$ is the product of the spreading sequence and the symbols transmitted and $\tau_{ji} = (\tau_j - \tau_i)/T_c$.

Using the results reported in document [1], it can easily be shown that the output $\hat{o}_k$ of the rake receiver 11 can be represented as follows:

$$\hat{o}_k = \sum_{j=1}^{L} h_j^* z_k(\tau_j) = \sum_{l=-L'}^{L'} g_l(k) s_{k-l} + w_k$$ (10)

in which:

$$w_k = \sum_{j=1}^{L} h_j^* w_k(\tau_j)$$ (11)

$g_l(k)$ is the l-th amplitude of the equivalent model at the output of the rake receiver 11, and (2L'+1) is the number of echoes of the equivalent model 16.

Assuming that the path delays are spaced by a multiple of the chip period $T_c$, the parameters of the equivalent model 16 are given by the following equations:

$$L' = 1 + \max\left\{\left\lfloor \frac{i}{n} \right\rfloor\right\}$$ (12)

$$g_0(k) = \sum_{j=1}^{L} |h_j|^2 + \sum_{-1 < \frac{\tau_{ji}}{N} < 1} h_j^* h_i \sum_{n=\epsilon_{ij}^-(k)}^{\epsilon_{ij}^+(k)} e_n^* e_{n+\tau_{ji}}$$ (13)

$$g_l(k) = \sum_{l-1 < \frac{\tau_{ji}}{N} \leq l} h_j^* h_i \sum_{n=kN}^{kN-\tau_{ji}-1-(l-1)N} e_n^* e_{n+\tau_{ji}} +$$

$$\sum_{l < \frac{\tau_{ji}}{N} < l+1} h_j^* h_i \sum_{n=kN-\tau_{ji}-lN}^{(k+1)N-1} e_n^* e_{n+\tau_{ji}}, \; \forall \; 1 \leq l \leq L,$$ (14)

$$g_{-l}(k) = \sum_{-l \leq \frac{\tau_{ji}}{N} < -(l-1)} h_j^* h_i \sum_{n=(k+1)N-\tau_{ji}+(l-1)N}^{(k+1)N-1} e_n^* e_{n+\tau_{ji}} +$$

$$\sum_{-l-1 < \frac{\tau_{ji}}{N} < -l} h_j^* h_i \sum_{n=kN}^{(k+1)N-\tau_{ji}+lN} e_n^* e_{n+\tau_{ji}}, \; \forall \; 1 \leq l \leq L,$$ (15)

$$\epsilon_{ij}^-(k) = \max\,(kN-\tau_{ji}, kN)$$ (16)

and $$\epsilon_{ij}^{+}(k) = \min\,((k+1)N-\tau_{ji}, (k+1)N)$$ (17)

Figure 5:
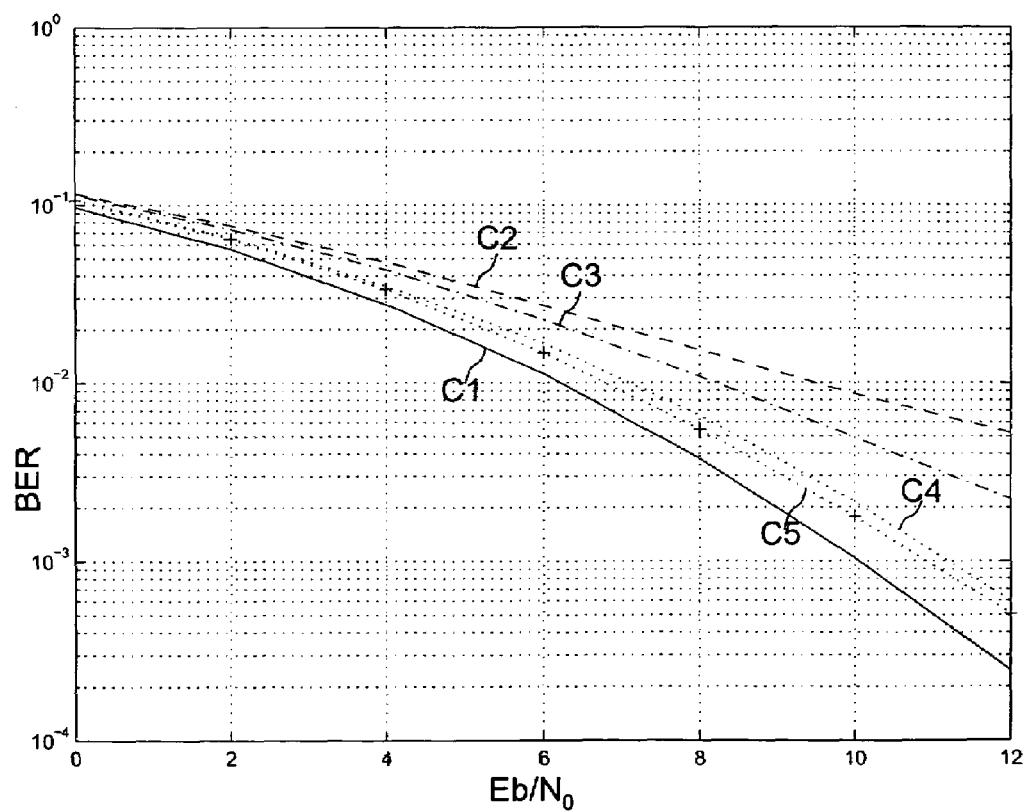
FIGS. 5 and 6 are curves of the bit error rate as a function of the signal-to-noise ratio illustrating the performance of the receivers shown in FIGS. 2 to 4.

The FIG. 5 curves give the bit error rate BER as a function of the signal-to-noise ratio $E_b/N_0$ in the ideal case (curve C1) and at the rake receiver output (curve C2).

Figure 6:
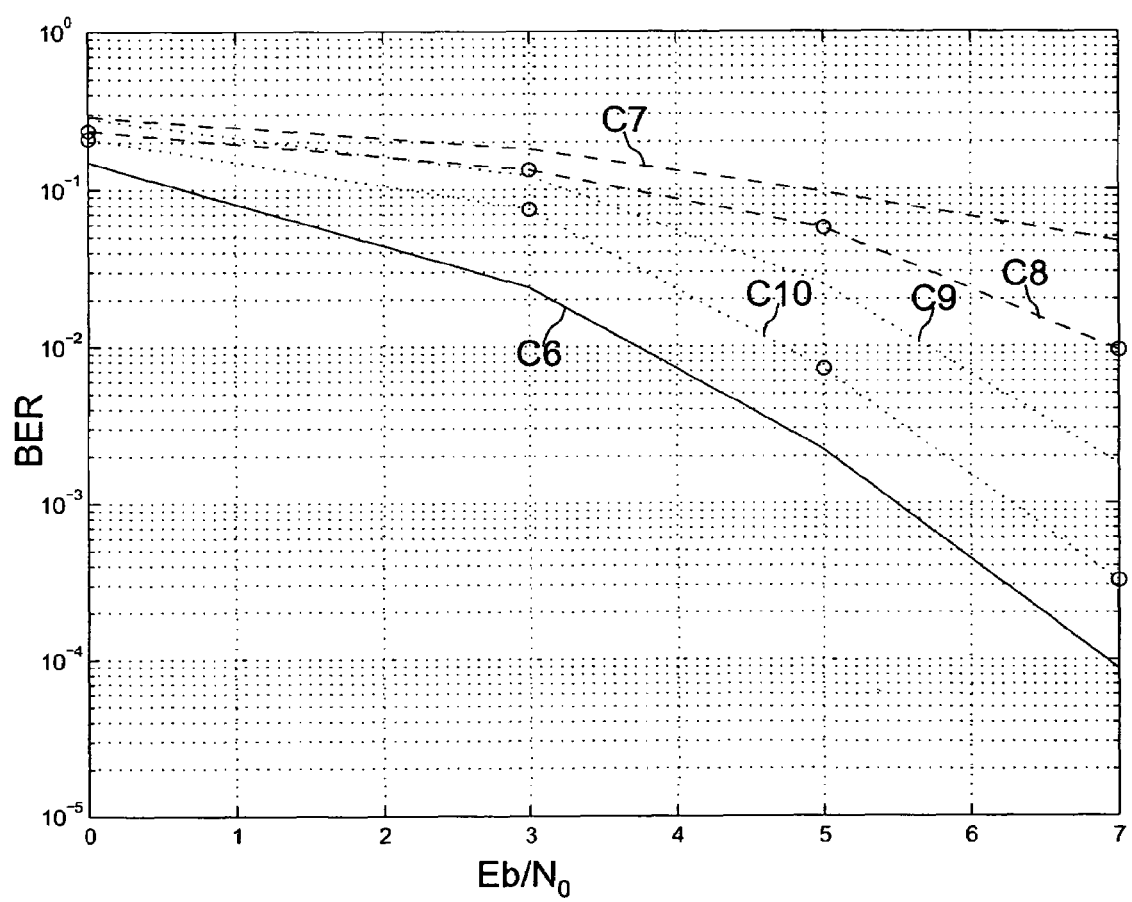

These curves, and those of FIG. 6, were obtained by simulation with a spreading factor of 4, an EQ-4 transmission channel with four paths with respective delays separated by a chip period, each path having a circular complex Gaussian shape or being subject to Rayleigh attenuation. The output code is a recursive systematic code with 16 states, of ratio ½ and with generation polynomials $$\left(1, \frac{1+D^3+D^4}{1+D+D^4}\right)$$

generating a pre-encoded sequence $\underline{c}$ that is sent to a pseudo-random interleaver and divided into frames.

Comparing the curves C1 and C2 shows that the performance of this kind of receiver is very poor.

If, as recommended in references [2] and [3], an LMMSE equalizer is placed upstream of the rake receiver, to reduce the degradation caused by intersymbol interference resulting from a low spreading factor, the estimate of the i-th chip symbol takes the following form:

$$\hat{d}(i) = h^0(i)^H \left(H(i)H(i)^H + \frac{N_0}{2\sigma_d^2} I_{2(M_1+M_2)+1}\right)^{-1} r(i) \quad (18)$$

in which $\sigma_d^2$ is the variance of the chip sequence.

The curve C3 in FIG. 5, which shows the performance obtained with this kind of equalizer, shows that this solution does not significantly improve the performance of the rake receiver.

To improve significantly the performance of the rake receiver 11 of the invention, there is placed at its output an intersymbol interference reduction device 12 designed around a suboptimal DDFSE detector based on a trellis with a reduced number of states, this kind of detector using a channel equivalent model 16.

Before they are applied to the DDFSE detector, the samples are delayed to render the channel equivalent model 16 causal. They can then be represented as follows:

$$y_k = z^{-L'} \hat{o}_k = \sum_{l=0}^{2L'} h_l(k) s_{k-l} + w_k \quad (19)$$

in which the vector $\underline{h}_l(k) = g_{l-L'}(k)$, this vector representing the vector of the channel coefficients $[\underline{h}_0(k), \ldots, \underline{h}_{2L'}(k)]^T$.

The DDFSE detector then operates on a trellis with a reduced number of states (see document [8]), compared to the BCJR technique which applies a maximum a posteriori probability (MAP) criterion to a complete trellis with $Q^{2L'}$ states, where Q is the number of points of the PSK modulation constellation and (2L'+1) is the number of paths of the channel equivalent model 16.

This kind of trellis is in fact a finite state machine, spread in time and in which transitions between states depend only on the preceding state, the number of states at each instant being constant. In this kind of trellis, a section represents all of the transitions between the states corresponding to two successive instants.

In the DDFSE detector, the trellis is therefore reduced to a number of states $Q^{v_r}$, where $v_r$ is a positive integer called the reduced memory and selected so that or $v_r < 2L'$ in the case of the DDFSE detector.

A trellis input sequence $a_1^n$ is generally said to terminate with a substate $\underline{s}$ if $a_1^n$ terminates with the substring $s = a_{n-v_r+1}^n$. At a depth $\underline{n}$, the substates space $S_n$ coincides with the complete space $S_n$ of the states of the BCJR trellis if $v_r = 2L'$. If $v_r < 2L'$, $S_n$ is reduced to a subset comprising all possible substates $\underline{s}$ derived from all the states:

$$|S_n| = Q^{v_r}, \forall n \in [0, \tau] \text{ et } |B_n| = Q^{v_r+1}, \forall n \in [1, \tau] \quad (20)$$

The notation employed in the above equations applies to the definition of a subtrellis T(S, B) to which the DDFSE algorithm is applied.

In each section, and for all transitions, the branch metric calculation implies convolution of the impulse response in discrete time of the channel with the sequence of 2L'+1 symbols already estimated. Only the first $v_r+1$ symbols estimated for this sequence are available at the transition being processed and at the starting subtrellis substate with which it is connected.

At each temporal index $n \in [1, \tau]$ and for all the bit indices $j \in [1, q]$, the optimum symbol by symbol BCJR algorithm supplies the logarithms of the a posteriori probability ratios, in accordance with the following equation:

$$\lambda(a_{n,j}) = \ln \frac{Pr(a_{n,j} = 1 | y_1^\tau, \hat{h}(n))}{Pr(a_{n,j} = 0 | y_1^\tau, \hat{h}(n))} \quad (21)$$

in which $\hat{h}$ is an estimate (or re-estimate) of the transverse vector of the channel coefficients (if possible converted for minimum phase), and $y_1^\tau$ is an observed sequence of length $\tau$. In the following derivation, the conditioning by $\hat{h}$ is implicit and omitted to simplify the expressions.

If marginalization is applied to the marked bit input symbol sequences, the equation (21) can be re-written in the following form:

$$\lambda(a_{n,j}) = \ln \frac{\sum_{a_1^\tau, a_{n,j}=1} p(a_1^\tau, y_1^\tau)}{\sum_{a_1^\tau, a_{n,j}=0} p(a_1^\tau, y_1^\tau)} \quad (22)$$

in which $$p(a_1^\tau, y_1^\tau) = Pr(y_1^\tau = y_1^\tau | a_1^\tau) Pr(a_1^\tau = a_1^\tau).$$

Making the following Min-Log-BCJR approximation:

$$-\ln\left(\sum_k \exp(-\Delta_k)\right) \simeq \min_k \Delta_k \quad (23)$$

where $\Delta_k$ represents non-negative quantities, the logarithm $\lambda(a_{n,j})$ of the a posteriori probability ratio can be evaluated using the following formula:

$$\lambda(a_{n,j}) \simeq \min_{a_1^\tau, a_{n,j}=0} \{-\ln p(a_1^\tau, y_1^\tau)\} - \min_{a_1^\tau, a_{n,j}=1} \{-\ln p(a_1^\tau, y_1^\tau)\} \quad (24)$$

in which $\{-\ln p(a_1^\tau, y_1^\tau)\}$ represents the metric cost, corresponding to the noise, of the path in the trellis, associated with input sequence $a_1^n$ and the received sequence $y_1^n$. Because of the reduction of the trellis, the DDFSE device 12 evaluates the quantity $\{-\ln p(a_1^\tau, y_1^\tau)\}$ in a suboptimal manner on the basis of the "per survivor" PSP algorithm that consists in selecting only one survivor per node. For a given subtrellis T(S,B) and a particular metric branch, the expression $\mu_n^{\leftrightarrow}(b)$ denotes the metric cost of the best path beginning at the substate 0 at the depth 0 and terminating at the substate 0 at the depth $\tau$ (taking account of the tailing symbols of the sequence), and passing through the branch $b \in B_n$ of the section $\underline{n}$. It is also assumed that each branch $b \in B_n$ contains three fields: a start substate field $b^- \in S_{n-1}$, an arrival substate field $b^+ \in S_n$ and a field labeled $b^\nabla = \{b_1^\nabla, \ldots, b_q^\nabla\}$, modeling a bit label input symbol for the intersymbol interference convolutional code of level 1 varying as a function of time at the instant $\underline{n}$. The output of the DDFSE device 12 can be represented as follows:

$$\lambda'(a_{n,j}) = \min_{b \in B_n, b_j^\nabla = 0} \mu_n^{\leftrightarrow}(b) - \min_{b \in B_n, b_j^\nabla = 1} \mu_n^{\leftrightarrow}(b) \quad (25)$$

The metric cost $\mu_n^{\leftrightarrow}(b)$ considered in the preceding formula can always be decomposed into a sum of three terms:

$$\mu_n^{\leftrightarrow}(b) = \mu_{n-1}^{\rightarrow}(b^-) + \xi_n(b) + \mu_n^{\leftarrow}(b^+) \quad (26)$$

in which $\mu_n^{\rightarrow}(s)$ represents the accumulated forward metric of the best subpath starting from the substate $0 \in S_0$ and terminating at the substate $s \in S_n$, and is calculated recursively using the following formula:

$$\mu_n^{\rightarrow}(s) = \min_{b \in B_{n-1}, b^+ = s} \{\mu_{n-1}^{\rightarrow}(b^-) + \xi_n(b)\} \quad (27)$$

with the following limit conditions:

$$\mu_0^{\rightarrow}(0) = 0 \text{ and } \mu_0^{\rightarrow}(s) = \infty, \forall s \neq 0 \quad (28)$$

and where $\mu_n^{\leftarrow}(s)$ represents the accumulated backward metric of the best subpath starting from the substate $s \in S_n$ and terminating at the substate $0 \in S_\tau$, and is calculated recursively using the following formula:

$$\mu_n^{\leftarrow}(s) = \min_{b \in B_{n+1}, b^- = s} \{\mu_{n+1}^{\leftarrow}(b^+) + \xi_{n+1}(b)\} \quad (29)$$

with the following limit conditions:

$$\mu_\tau^{\rightarrow}(0) = 0 \text{ and } \mu_\tau^{\rightarrow}(s) = \infty, \forall s \neq 0 \quad (30)$$

The branch metric $\xi_n(b)$ based on the PSP algorithm and used by the DDFSE device 12 is expressed as follows:

$$\xi_n(b) = \frac{1}{2\sigma^2} \left\| y_n - \hat{h}_0(n) s_n - \sum_{k=1}^{v_\tau} \hat{h}_k(n) s_{n-k} - \sum_{k=v_\tau+1}^{2L'} \hat{h}_k(n) \hat{s}_{n-k} \right\|^2 \quad (31)$$

In the above equation, the complex symbol $s_n$ penetrating the intersymbol interference code at the time $\underline{n}$ results simply from the redefinition of the branch label $b^\nabla$. The complex sequence of symbols $\{s_{n-v_r}, \ldots, s_{n-1}\}$ is simply deduced from the substate $b^-$, while the estimated sequence of symbols $\{\hat{s}_{n-2L'}, \ldots, \hat{s}_{n-v_r-1}\}$ is obtained by travelling backwards along the "survivor" path that terminates at $b^-$ and redefining the labels of the branches constituting it. The "survivor" paths are assumed to be memorized in a sliding traceback matrix of depth 2L'.

The curve C4 in FIG. 5 that shows the performance of this solution was obtained with a DDFSE reduced trellis complexity of four states ($v_r = 1$). This curve shows that even with a low interleaving factor (=4), and a significant reduction in the number of states of the trellis, this solution approximates the ideal solution, and in particular the solution shown by the curve C5, which employs a maximum likelihood sequence estimation (MLSE) type channel estimation, which cannot be applied to the CDMA technique because of its complexity.

Figure 3:
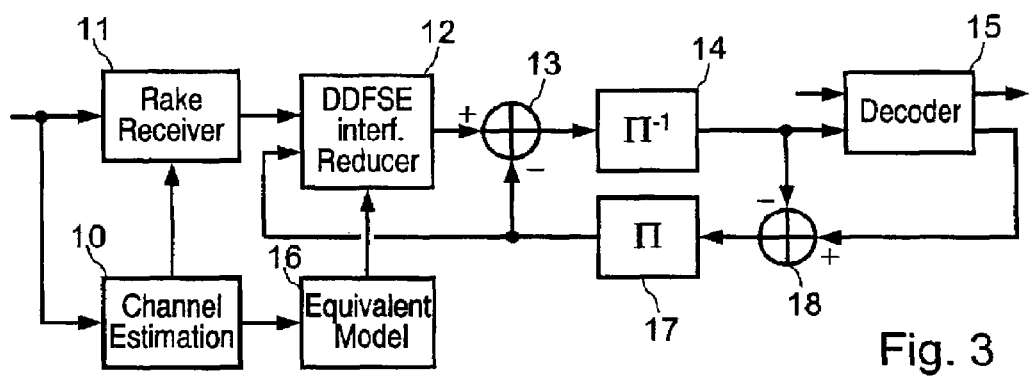
FIGS. 3 and 4 are diagrams showing two preferred variants of the reception system shown in FIG. 2.

To improve further the performance of this kind of receiver, as shown in FIG. 3, the invention proposes to connect the output of the device 12 to the positive input of a comparator 13 whose output is connected to the de-interleaver 14. The output of the de-interleaver 14 is connected to an input receiving the logarithm of the intrinsic probability ratio of the coded bits from the decoder 15 which supplies at a first output the logarithm of a posteriori probability ratios on the data bits transmitted and at a second output the logarithm of the a posteriori probability ratio on the coded bits that is determined by an operation that is the converse of the decoding applied to the decoded data bits after error correction. The second output of the decoder 15 is looped via a comparator 18 and an interleaver 17 to the negative input of the comparator 13 and to an input of the DDFSE device 12. The output of the de-interleaver 14 is also fed to the negative input of the comparator 18.

The decoder 15 can decode the channel code optimally using the BCJR algorithm. The interference reduction device 12 delivers a posteriori probability ratios on the value of the bits $a_{nj}$ of the symbols $a_n$ constituting the sequence $a_1^\tau$, using logarithms of the a priori probability ratios of the latter coming from the decoder (with the value 0 on the first iteration) and taking account of the received sequence $y_1^\tau$ and an estimated (or re-evaluated) value $\hat{h}(n)$ of the (equivalent) vector of the channel coefficients at the instant $\underline{n}$.

The a posteriori probability ratios approximated over the bits $\lambda'(a_{nj})$ can be divided into two portions using the following equation:

$$\lambda'(a_{nj}) = \lambda_a(a_{nj}) + \lambda_e(a_{nj}) \quad (32)$$

After de-interleaving by the de-interleaver 14, the complete sequence of extrinsic probability ratio logarithms becomes an intrinsic probability ratio logarithm sequence applying to the bits of the coded symbols, and which is applied to the decoder 15. In an analogous manner, at the output of the decoder 15, each a posteriori probability ratio logarithm $\lambda(c_{nj})$ applying to the coded bit can be decomposed into an a priori portion and an extrinsic portion. The latter can be calculated by subtracting bit by bit in the comparator 18 the logarithm $\lambda_a(c_{nj})$ of the a priori ratio at the output of the decoder from the logarithm $\lambda(c_{nj})$ corresponding to the a posteriori ratio:

$$\lambda_e(c_{nj}) = \lambda(c_{nj}) - \lambda_a(c_{nj}) \quad (33)$$

The sequence of extrinsic probability ratio logarithms applying to the coded bits at the output of the decoder 15 is re-interleaved by the interleaver 17 and returned to the decoder 15 after the next detection of N sequences of a priori probability ratio logarithms applying to the symbol bits. By repeating this process a certain number of times, a great increase in the signal-to-noise ratio is achieved in relation to the data bits of the received sequences.

Because of its very regular Viterbi structure, and its good performance given its moderate complexity, the DDFSE detector of the device 12 appears to be perfectly suitable for turbo-detection as effected in the receiver shown in FIG. 3.

For the first iteration, the system shown in FIG. 3 operates in exactly the same way as described with reference to FIG. 2. On the second and subsequent iterations, equation (31) giving the branch metric $\xi_n(b)$ used by the DDFSE device 12 has an additional term:

$$\xi_n(b) = \frac{1}{2\sigma^2}\left\|y_n - \hat{h}_0(n)s_n - \sum_{k=1}^{v_r}\hat{h}_k(n)s_{n-k} - \sum_{k=v_r+1}^{2L'}\hat{h}_k(n)\hat{s}_{n-k}\right\|^2 - \ln Pr(b=b) \quad (34)$$

It is calculated only once during the recursive forward processing, and then stored in memory.

The a priori probability logarithm $\ln Pr(b=b)$ on the branch $b \in B_n$ in equation (31) corresponds exactly to the a priori probability logarithm of the label $b^\nabla$ that it carries, so that:

$$\ln Pr(b=b) = \ln Pr(b^\nabla = b^\nabla) = \ln Pr(a_n = b^\nabla) \quad (35)$$

If perfect de-correlation is assumed between the a priori probability logarithms over the symbol bits $a_{nj}$ after re-interleaving of the sequence of extrinsic probability ratio logarithms coming from the code $C_0$, there is obtained:

$$\ln Pr(b=b^\nabla) = \sum_{j=1}^{q}\ln Pr(b_j^\nabla = b_j^\nabla) = \sum_{j=1}^{q}\ln Pr(a_{n,j} = b_j^\nabla) \quad (36)$$

Finally, using equations (25) and (36), the output $\lambda'(a_{nj})$ of the DDFSE device 12 applied to the symbol $a_{nj}$ can be decomposed into a sum of two logarithmic terms:

$$\lambda'(a_{nj}) = \lambda_a(a_{nj}) + \lambda'_e(a_{nj}) \quad (37)$$

where:

$$\lambda_a(a_{n,j}) = \ln\frac{Pr(a_{n,j}=1)}{Pr(a_{n,j}=0)} \quad (38)$$

represents the logarithm of the a priori ratio applying to the bit $a_{nj}$ supplied by the decoder 15, and where:

$$\lambda'_e(a_{n,j}) = \min_{b \in B_n, b_j^\nabla=0}\{\mu_{n-1}^\rightarrow(b^-) + \xi_n^{e,j}(b) + \mu_n^\leftarrow(b^+)\} - \min_{b \in B_n, b_j^\nabla=1}\{\mu_{n-1}^\rightarrow(b^-) + \xi_n^{e,j}(b) + \mu_n^\leftarrow(b^+)\} \quad (39)$$

with:

$$\xi_n^{e,j}(b) = \frac{1}{2\sigma^2}\left\|y_n - \hat{h}_0(n)s_n - \sum_{k=1}^{v_r}\hat{h}_k(n)s_{n-k} - \sum_{k=v_r+1}^{2L'}\hat{h}_k(n)\hat{s}_{n-k}\right\|^2 - \sum_{l \neq j}\ln Pr(a_{n,l} = b_l^\nabla) \quad (40)$$

the second term of this equation representing the logarithm of the extrinsic probability ratio on the bit $a_{nj}$ resulting from all the other bits of the symbols with bit labels of the sequence $a_1^\tau$ throughout the decoding process.

It must be emphasized that, if $v_r=2L'$, the algorithm executed by the DDFSE device 12 becomes formally equivalent to a Min-Log-BCJR algorithm applied to the whole of the channel trellis. If the processing were applied to only a reduced state trellis, the estimated sequences obtained from the history of the paths and involved in the derivatives of the branch metrics would degrade performance because of a possible error propagation effect. Nevertheless, it appears that the equivalent channels at the output of the rake receiver 11 do not introduce any significant error propagation into the structure of the DDFSE reduction device 12. As a result, the choice $v_r=1$ is sufficient in most cases.

The performance of conventional channel estimation obtained by correlation and average calculation processing applied to a sequence of pilot symbols is degraded with low spreading values because of intersymbol interference.

To illustrate this, FIG. 6 shows curves of bit error rate as a function of signal-to-noise ratio at the output of the decoder 15 obtained with different solutions. In this figure, the curve C6 corresponds to the ideal situation. The curve C7, which corresponds to the situation in which a conventional channel estimation is used, shows that this solution offers relatively poor performance, relatively far removed from the ideal.

Figure 7:
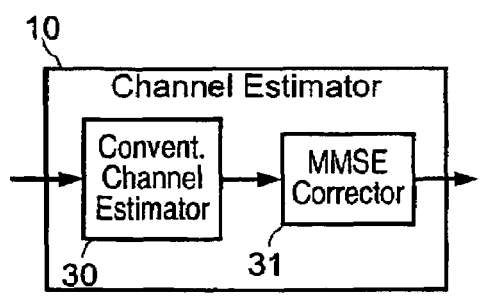
FIG. 7 is a diagram showing an embodiment of a channel estimator of the invention.
Figure 4:
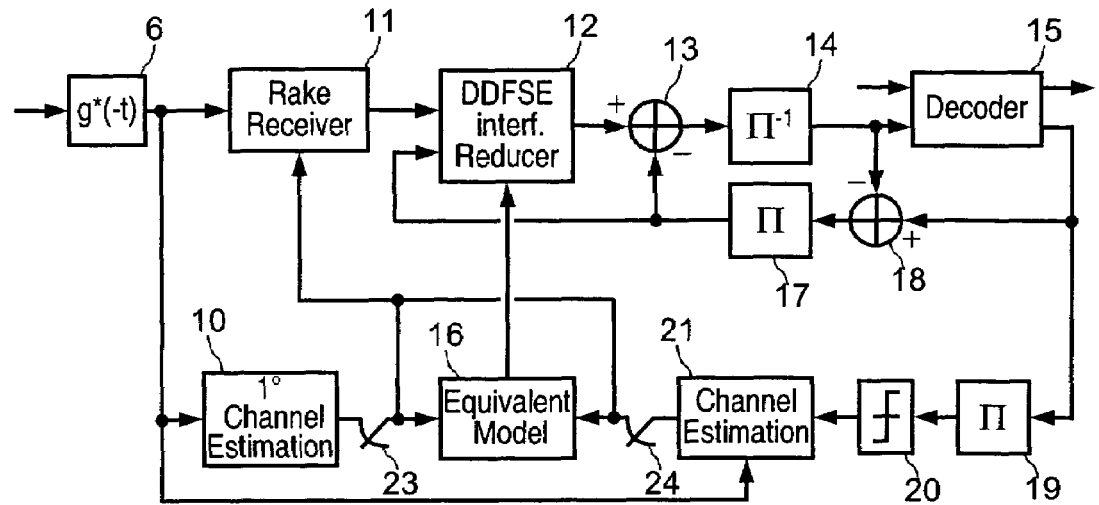

The present invention proposes to improve the quality of channel estimate in the systems shown in FIGS. 2 to 4 by using the known structure of the intersymbol interference. To this end, the channel estimator 10 shown in FIG. 7 is used. This channel estimator comprises a conventional channel estimator 30 whose output is connected to a channel estimate corrector 31 using the minimum mean squared error (MMSE) method or the least squares (LS) method, delivering a channel estimate that is used by the device 12 and by the channel modeling device 16.

One example of a conventional channel estimator is described in reference [1], for example.

If it is assumed that the path delays are spaced by a multiple of the chip period $T_c$ and that the spreading of the delays is less than the symbol period $T_s$, the conventional channel estimates are obtained using the following formula:

$$\tilde{h} = (\tilde{h}_1, \ldots, \tilde{h}_L)^T = Mh + n \quad (41)$$

in which:

$$M = [M_{ji}]_{0 \leq j, i \leq L-1}, \quad (42)$$

$$M_{ii} = 1, 0 \leq i \leq L-1, \quad (43)$$

$$M_{ji} = \sum_{p=0}^{P-1}\frac{s_p^*}{|s_p|^2}\left[s_{p+\left\lfloor\frac{\tau_{ji}}{N}\right\rfloor}\sum_{n=p_N}^{(p+1)N-1-\tau_{ji}+N\left\lfloor\frac{\tau_{ji}}{N}\right\rfloor}e_n^*e_{n+\tau_{ji}} + s_{p+\left\lfloor\frac{\tau_{ji}}{N}\right\rfloor+1}\sum_{n=(p+1)N-\tau_{ji}+N\left\lfloor\frac{\tau_{ji}}{N}\right\rfloor}^{(p+1)N-1}e_n^*e_{n+\tau_{ji}}\right], \quad (44)$$

if $\tau_j > \tau_i$ and

-continued $$M_{ji} = \sum_{p=0}^{P-1} \frac{s_p^*}{|s_p|^2} \left[ s_{p+\lfloor \frac{\tau_{ji}}{N} \rfloor +1} \sum_{n=pN-\tau_{ji}+N\lfloor \frac{\tau_{ji}}{N} \rfloor}^{(p+1)N-1} e_n^* e_{n+\tau_{ji}} + \right.$$
$$\left. s_{p+\lfloor \frac{\tau_{ji}}{N} \rfloor} \sum_{n=pN}^{pN-1-\tau_{ji}+N\lfloor \frac{\tau_{ji}}{N} \rfloor} e_n^* e_{n+\tau_{ji}} \right], \text{ if } \tau_j < \tau_i \quad (45)$$

where p is the number of symbols in the pilot sequence, $h=(h_1, \ldots, h_L)^T$ being the perfect (noiseless) channel coefficients, n being the channel noise estimate that is assumed to have a variance equal to $N_0/E_{pilot}$, and $E_{pilot}$ is the pilot symbol energy. MMSE channel estimate is deduced from the conventional channel estimate using the following formula:

$$\hat{h}^{MMSE} = L^H \hat{h} \quad (46)$$

in which $$L = \text{argmin} \| \hat{h}^{MMSE} - h \| \quad (47)$$

Using equation (18), it can be deduced that:

$$\hat{h}^{MMSE} = M^H \left( MM^H + \frac{N_0}{E_{call\ director}} I_L \right)^{-1} \hat{h} \quad (48)$$

in which $M^H$ is the conjugate transposed matrix of the matrix M.

An estimate can also be effected using the LS method:

$$\hat{h}^{LS} = (M^H M)^{-1} M^H \hat{h}. \quad (49)$$

However, this estimation method does not take account of the noise power and therefore degrades performance in terms of signal-to-noise ratio compared to MMSE estimation. As is apparent in FIG. 6, the simulations show that a conventional channel estimate, based only on correlation with pilot symbols, leads to poor performance with a low spreading factor (curve C7). The structure of the intersymbol interference must be taken into account, which is possible using the MMSE and LS methods. The performance achieved using the MMSE method is shown by the curve C9 in FIG. 6, which indicates a significant improvement over conventional methods.

In an advantageous variant of the invention shown in FIG. 4, the receiver of the invention comprises an iterative detection loop for effecting channel re-estimation. The loop comprises an interleaver 19 connected to the output of the decoder 15 and whose output is connected via a threshold comparator 20 to an iterative channel estimation device 21. The comparator 20 transforms the weighted or flexible output of the decoder 15 into a "hard" output, i.e. one that is equal to 0 or to 1, depending on whether the weighted value is greater than a predetermined threshold or not.

What is more, the signal applied at the input of the rake receiver 11 is also applied to the iterative channel estimation device 21 and to a channel estimation device 10 used to effect a first channel estimation using the pilot sequence, these devices supplying channel estimates by way of respective switches 23, 24 to the channel modeling device 16 designed to determine an equivalent channel model that is applied to the input of the DDFSE device 12.

The receiver effects a first decoding on the basis of the channel estimates determined by the device 10 using pilot symbols and applied to the channel modeling device 16 (switches 23, 24 respectively closed and open). The estimated codes coming from the channel decoder 15 are then used by the device 21 to re-estimate the channel, in order to reduce the channel estimation noise for the next iteration, the channel estimates determined in this way being applied to the modeling device 16 (switches 23, 24 respectively open and closed).

Of course, the iterative channel estimation process shown in FIG. 4 can also be applied to the system shown in FIG. 2, i.e. to a receiver that does not include the iterative detection loop shown in FIG. 3.

The curves C8 and C10 in FIG. 6 show the performance achieved using the solution shown in FIG. 4 employing an iterative channel estimation method, the curve C8 corresponding to the situation in which a conventional channel estimator is used and the curve C10 to a channel estimator with MMSE correction. These two curves show that this method improves performance and, in the case of channel estimation with MMSE correction, approximates the ideal situation shown by the curve C6.

The invention claimed is:

1. A method for receiving a signal transmitted on a multipath transmission channel using a spread spectrum technique with a low spreading factor, said signal being transmitted in the form of sequences of coded binary symbols comprising predefined pilot symbols and data symbols, multiplied by a spreading sequence, said method including a step of determining a channel estimate using received predefined pilot symbols, the method comprising
   reconstituting the transmitted signal by means of a rake receiver using a rake receiver that utilizes the channel estimate on the basis of received signals that were transmitted over the multiple paths of the transmission channel,
   determining an equivalent model of the channel as seen at the output of the rake receiver as a function of the channel estimate,
   reducing intersymbol interference in the reconstituted transmitted signal resulting from the low spreading factor, using the channel equivalent model and a DDFSE detector based on a trellis with a reduced number of states and delivering at its output estimated values of the received coded symbols,
   de-interleaving the coded symbols, and
   decoding the estimated values of the de-interleaved coded symbols to reconstitute the transmitted data symbols.

2. The method according to claim 1, wherein the estimated values of the received coded symbols obtained after interference reduction and decoding are weighted or flexible values.

3. The method according to claim 2, wherein the steps of reducing intersymbol interference and decoding are included in an iterative process wherein the coded and de-interleaved symbols obtained in an iteration n are re-estimated during decoding as a function of the data symbols obtained after decoding and error correction, the difference between the re-estimated coded symbols obtained in the same iteration and the de-interleaved coded symbols obtained in the next iteration n+1 is re-interleaved and then applied to the input of the DDFSE detector and subtracted from the coded symbols obtained in the iteration n 1 at the output of the DDFSE detector.

4. The method according to claim 1, wherein the channel estimate is improved using a least squares (LS) method.

5. The method according to claim 1, wherein the channel estimate is improved using a minimum mean square error (MMSE) algorithm.

6. The method according to claim 1, wherein the channel is estimated in an iterative process and the coded and de-interleaved symbols obtained in an iteration n are re-estimated during decoding as a function of the data symbols obtained after decoding and error correction, the re-estimated coded symbols are interleaved, a channel estimate is obtained on the basis of the re-estimated and interleaved coded symbols, an equivalent channel model is determined from the channel estimate, and the channel estimate and the channel equivalent model determined in an iteration n are respectively used to reconstitute the transmitted signal and to reduce intersymbol interference in the next iteration n+1.

7. A system for receiving a signal transmitted on a multipath transmission channel using a spread spectrum technique and a low spreading factor, said signal being transmitted in the form of a sequence of coded binary symbols comprising predefined pilot symbols and data symbols and multiplied by a spreading sequence, said system comprising a rake receiver for reconstituting the transmitted signal using a channel estimate on the basis of the signals received and transmitted by the multiple paths of the transmission channel and first channel estimation means for estimating the channel on the basis of the pilot symbols received, to deliver a transmission channel estimate to the rake receiver, wherein the system further comprises:
- channel modeling means for determining an equivalent model of the channel as seen at the output of the rake receiver as a function of the channel estimate,
- reduction means for reducing intersymbol interference between received symbols, the reducing means comprising a DDFSE detector based on a trellis with a reduced number of states, for reducing intersymbol interference between received symbols using the equivalent channel model and reconstituting estimated values of the coded symbols received,
- de-interleaving means for de-interleaving the estimated values of the coded symbols received, and
- decoding means for decoding the estimated and de-interleaved values and supplying the data symbols transmitted.

8. The reception system according to claim 7, wherein the estimated and de-coded values delivered by the intersymbol interference reduction means and the decoding means are weighted or flexible values.

9. The reception system according to claim 7, further comprising:
- means for re-estimating the coded symbols as a function of the decoded data symbols after error correction,
- first subtraction means for subtracting the estimated and de-interleaved coded symbols from the re-estimated coded symbols and obtaining a sequence of extrinsic re-estimated coded symbols,
- first interleaving means for interleaving the sequence of extrinsic re-estimated coded symbols, and
- second subtraction means for subtracting the sequence of extrinsic re-estimated coded symbols from the sequence of symbols received and estimated by the reduction means on the next iteration.

10. The reception system according to claim 9, further comprising:
- second interleaving means for interleaving the sequence of re-estimated coded symbols at the output of the decoding means, and
- second channel estimation means for supplying a transmission channel estimate on the basis of the interleaved sequence of re-estimated coded symbols to the means for determining an equivalent channel model and to the rake receiver.

* * * * *